United States Patent [19]

Inoue

[11] Patent Number: 5,153,867
[45] Date of Patent: Oct. 6, 1992

[54] CARTRIDGE SHUTTER ACTUATING DEVICE IN RECORDING AND/OR REPRODUCING APPARATUS

[75] Inventor: Yoshihisa Inoue, Hannou, Japan

[73] Assignee: Nakamichi Corporation, Tokyo, Japan

[21] Appl. No.: 467,065

[22] Filed: Jan. 18, 1990

[30] Foreign Application Priority Data

Jan. 18, 1989 [JP] Japan .................. 1-9425

[51] Int. Cl.⁵ .................. G11B 33/02; G11B 17/04
[52] U.S. Cl. .................. 369/77.2; 360/99.06
[58] Field of Search .............. 369/291, 77.2; 206/444; 360/133, 99.06

[56] References Cited

U.S. PATENT DOCUMENTS

| 4,380,780 | 4/1983 | Hirata | 360/133 |
| 4,573,093 | 2/1986 | Obama | 360/99.06 |
| 4,587,585 | 5/1986 | Shimaoka | 360/133 |
| 4,614,990 | 9/1986 | Saito | 360/133 |
| 4,811,137 | 3/1989 | Muto | 360/99.06 |
| 4,833,553 | 5/1989 | Noda | 360/99.06 |
| 4,878,139 | 10/1989 | Hasegawa | 360/99.06 |
| 4,953,042 | 8/1990 | Yoshikawa | 360/99.06 |
| 4,964,005 | 10/1990 | Uzuki | 360/99.06 |

FOREIGN PATENT DOCUMENTS

0102361  6/1983  Japan .................. 360/99.06

Primary Examiner—John W. Shepperd
Assistant Examiner—Michael C. Kessell
Attorney, Agent, or Firm—Marshall & Melhorn

[57] ABSTRACT

A device for actuating a shutter of a disc cartridge along with insertion of the disk cartridge into a holder of a recording and/or reproducing apparatus is disclosed. The device includes an engaging pin mounted on a lever member and adapted to be in engagement with one end of the shutter during the travel of the cartridge from a half-loaded position to a full-loaded position. The engaging pin extends downwardly through an oblique-inwardly engaging slot and protrudes into a cartridge accommodating space within the holder. A very small force is needed to smoothly actuate the shutter because a guide pin secured to the cassette or disc cartridge holder will act as an axis of rotation for the lever member 14 by virtue of a slot provided in the other end of the lever member from the engaging pin. The guide pin is rotatably and linearly displaced with regard to the slot in the lever member. In a second embodiment of the invention, a second pin is placed in the lever member in place of the slot and a platform having a slot in the cartridge inserting direction engages said second pin.

4 Claims, 11 Drawing Sheets

PRIOR ART

FIG. 12

PRIOR ART

FIG. 13

CARTRIDGE SHUTTER ACTUATING DEVICE IN RECORDING AND/OR REPRODUCING APPARATUS

BACKGROUND OF THE INVENTION

1. Field of the Invention

This invention relates to a recording and/or reproducing apparatus in general, and more particularly to a device for automatically opening and closing the shutter of a magneto optical disc cartridge used with magneto optical recording and/or reproducing apparatus. The shutter is opened when the cartridge is inserted, and closed when it is removed.

2. Description of the Prior Art

A magnetic or magneto optical disc has recently been introduced as a medium for magnetic or magneto optical recording.

In the U.S. Pat. No. 4,517,617 issued to Ohkawara discloses a disc cartridge comprising a hard jacket made from such material as plastic. The recording disc is substantially enveloped within the hard jacket for preventing damage and contamination of the disc itself and/or a recording area thereof which otherwise might occur when handling the disc or inserting it into the recording and/or reproducing apparatus. The hard jacket is provided with an aperture for insertion of a magnetic head mounted on the recording and/or reproducing apparatus when installed or loaded thereon. This head insertion aperture is normally closed by a shutter member slidably connected to the hard jacket, capable of preventing dust or fingerprints from entering through the head insertion aperture, and therefore preventing contamination of the recording area of the disc. The shutter is provided with an access window which will allow the magnetic head to obtain access to the recording area of the disc, when the disc cartridge is loaded into the apparatus, for performing a desired recording and/or reproducing operation.

With the system and apparatus disclosed in the above-referred U.S. Pat. No. 4,517,617, the shutter must be hand-manipulated to be laterally slid or opened before the disc cartridge has been loaded into the apparatus, and manually closed after completing the desired recording and/or reproducing operation. Further, the operator's fingerprints or other foreign matter would tend to be adhered to the recording area of the disc when manipulating the disc cartridge for opening or closing the shutter.

Such problem can be solved by a mechanism or device capable of automatically opening and closing the shutter as the disc cartridge is being inserted into the apparatus and discharged out of the apparatus. An example of such shutter actuating devices is disclosed in the Japanese Utility-Model Publication No. (Sho) 62-15895, which includes, as diagrammatically shown in FIG. 12, an operating lever D rotatably mounted on a cartridge holder A of the recording and/or reproducing apparatus and a cut-out notch G formed at the front edge of the shutter C. The lever D has at its one end a vertical pivot E located on the inserting side, connected to the holder A, and at the other end an engaging pin F located at the other side, adapted for engagement with the notch G of the shutter C. During insertion or advancement of the cartridge B into the holder A, engagement between the engaging pin F and the notch G will cause the lever D to rotate in the counter clockwise direction, so that the shutter C is laterally slid within a recessed section I of the cartridge B, against a biasing force of a spring (not shown). Thus, the shutter C may be completely opened. When the cartridge B is being ejected from the loaded position in the apparatus, the lever D is rotated in the opposite direction due to a spring H connected between the holder A and the lever D, so that the shutter C will be automatically closed.

Figure 12:
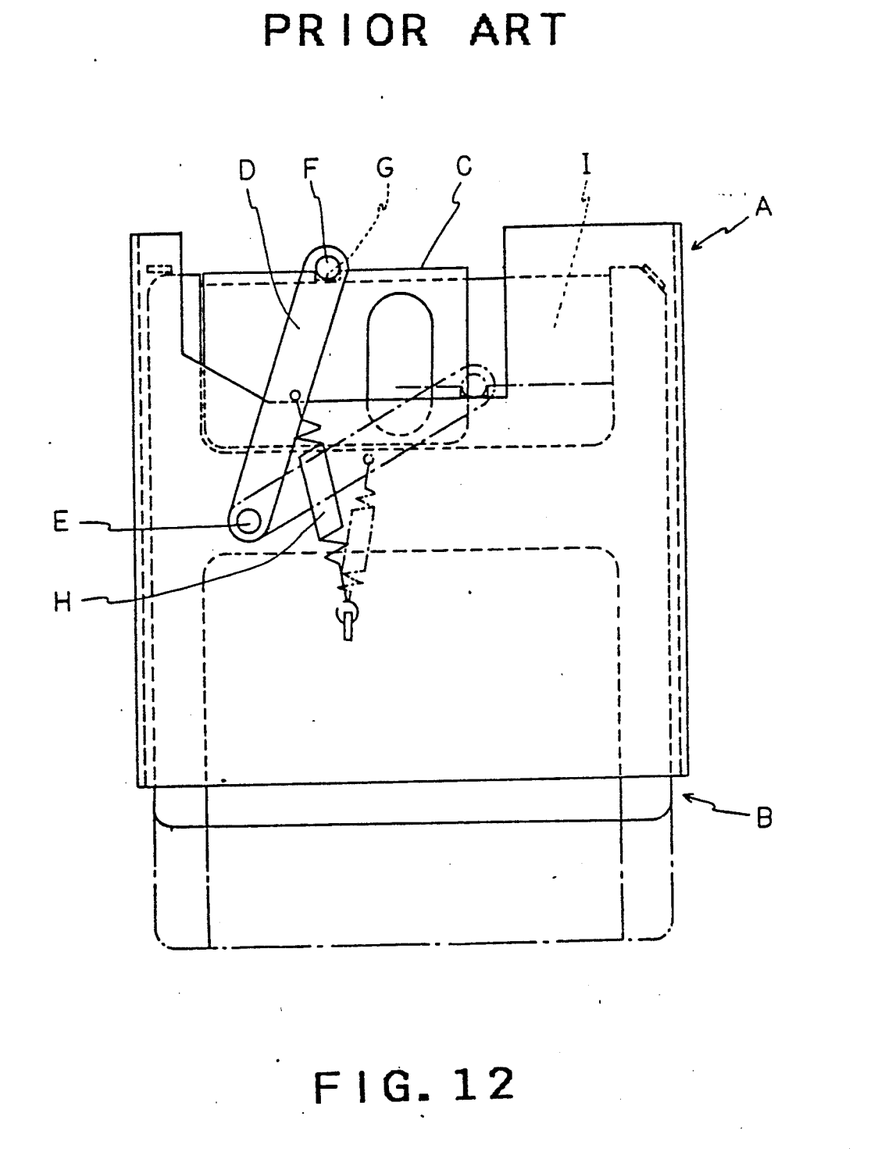
FIG. 12 is a plan view diagrammatically showing the shutter actuating mechanism according to the prior art.

With this prior art arrangement, the lever D will be in contact with the front edge of the cartridge B (the shutter C) at an acute angle during the initial stage of insertion of the disc cartridge B, so that the lever D may be smoothly rotated with a slight pushing force applied to the cartridge B. However, as the cartridge B is further advanced into the holder A, an angle between the lever D and the front edge of the cartridge B becomes closer to a right angle, which would prevent smooth rotation of the lever D. Accordingly, a considerable force will be required to actuate the shutter C as the cartridge B approaches the fully loaded position.

In the above-referred prior art device, the lever D is arranged substantially above the shutter C of the disc cartridge B when it is fully loaded in the holder A of the magnetic recording and/or reproducing apparatus. This requires a considerable space or area for arrangement of the shutter actuating mechanism above the apparatus.

In another type recording and/or reproducing apparatus for use in combination with a magneto optical disc, it is necessary to mount a bias magnet on the apparatus opposite an optical head mechanism, across the magneto optical disc in the full-loaded cartridge. In this arrangement it becomes difficult or practically impossible to install the shutter operating lever substantially above the shutter as in the above-referred prior art device.

Figure 13:
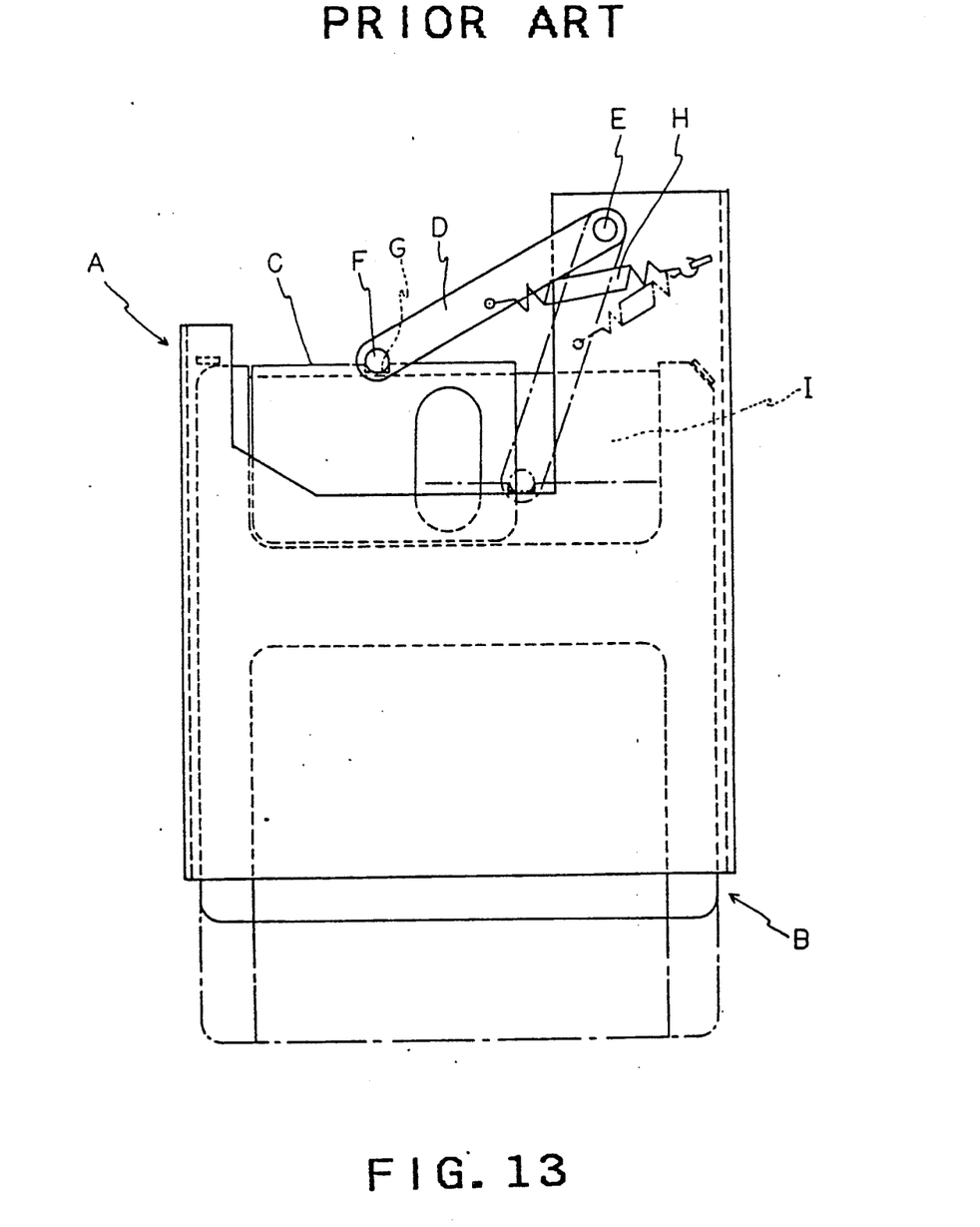
FIG. 13 is a plan view diagrammatically showing an anticipated modification of the prior art mechanism shown in FIG. 12.

It has been attempted to modify the above-referred prior art arrangement of the shutter operating lever D such that the pivot E is mounted relatively in the backside of the apparatus, with the engaging pin F located at the inserting side. Such modification can leave a substantial space above the shutter C available for arrangement of the bias magnet. However, in order that the shutter actuating device shown in FIG. 13 may operate smoothly, it is necessary that the lever D should always be inclined with respect to the cartridge inserting direction. More specifically, even when the disc cartridge B is still in the unloaded position, the pivot E should be positioned outward (or rightward in the drawing) of the engaging pin F. This requirement cannot be satisfied in the case of the magneto optical recording and/or reproducing apparatus because of a limited space between the engaging edge of the shutter of the magneto optical disc cartridge and the side face of the cartridge, which is not enough to arrange the shutter operating lever D in the manner as shown in FIG. 13.

Figure 3:
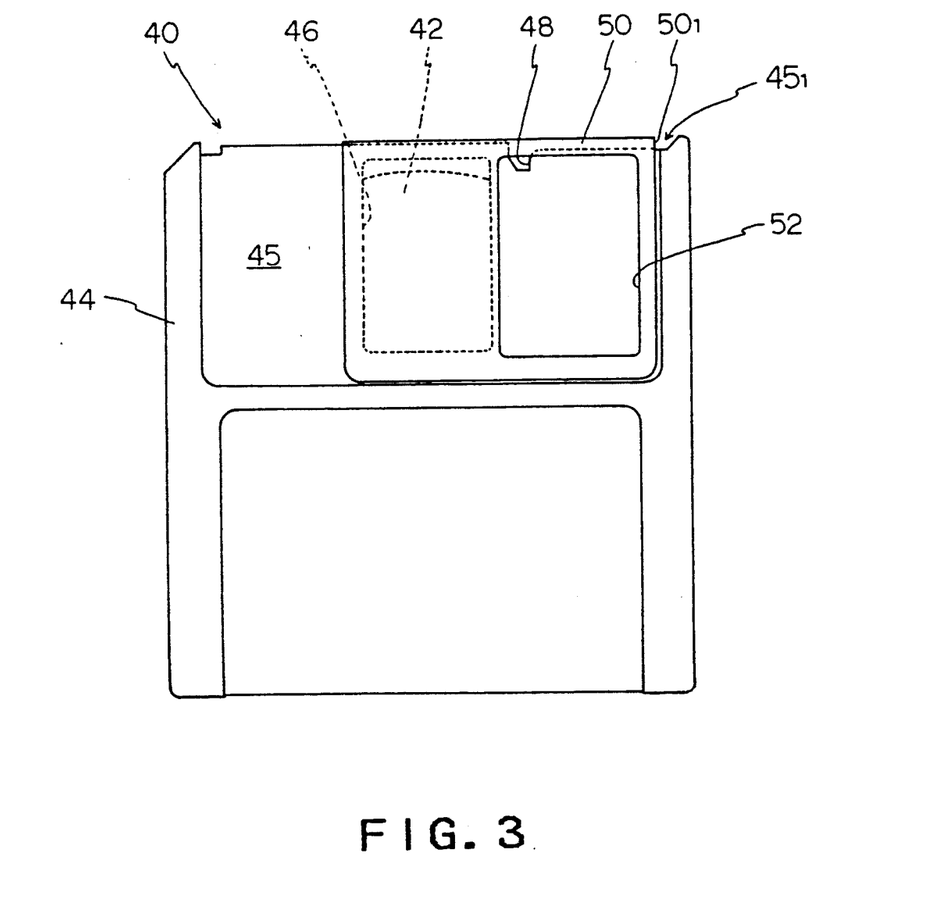
FIG. 3 is a plan view of the magneto optical disc cartridge with its shutter being in a closed position.

Standardization of a specific format of the magneto optical disc cartridge is now being settled. In accordance with the format, such disc cartridge construction as shown in FIG. 3 has been proposed. A shutter 50 is slidable within a recessed portion 45 of the disc cartridge 44. The shutter 50 has no cut-out notch G and may be actuated through engagement between an engaging edge 50 of the shutter 50 and an engaging portion of a shutter actuating device. The engaging edge 50 in the shutter closed position is positioned in close vicinity to the side face of the disc cartridge 44.

SUMMARY OF THE INVENTION

It is therefore a principle object of the invention to provide a novel shutter actuating mechanism or device for use in combination with a recording and/or reproducing apparatus, capable of actuating a cartridge shutter outside of a cartridge receiving holder in an apparatus.

Another object of the invention is to provide a shutter actuating mechanism which is most adaptable to a magneto optical recording and/or reproducing apparatus.

In accordance with one aspect of the invention there is provided a device for actuating a shutter which is slidably attached to a disc cartridge containing a disc-shaped recording medium. The shutter actuating device is used in a recording and/or reproducing apparatus to open the shutter and permit a recording and/or reproducing operation to take place when the disc cartridge is inserted or loaded into a holder of the recording and/or reproducing apparatus. The shutter actuating device comprises engaging means adapted to be in engagement with a specific portion of the shutter during a cartridge half-loaded position and a cartridge full-loaded position in the holder; and guide means for guiding the engaging means in substantially an oblique direction between a cartridge inserting direction and a shutter sliding direction. Preferably, the guide means comprises an oblique-inwardly extending groove formed on the holder and the engaging means comprises a pin extending through the groove and protruding into a cartridge accommodating space within the holder.

BRIEF DESCRIPTION OF THE DRAWINGS

The above and other objects and features of the invention will be apparent from the following description of a preferred embodiment thereof when read in conjunction with the accompanying drawings in which.

DETAILED DESCRIPTION OF THE PREFERRED EMBODIMENTS

Figure 1:
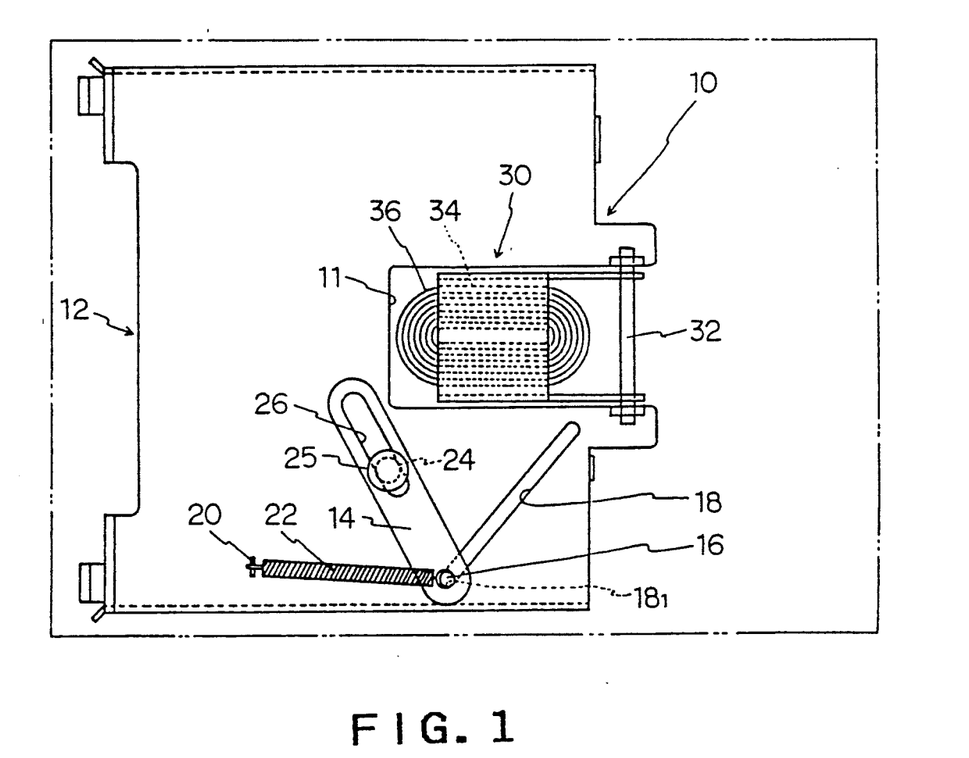
FIG. 1 is a top view showing a shutter actuating device embodying the invention, used in combination with a magneto optical recording and/or reproducing apparatus capable of performing a recording and/or reproducing operation with respect to a magneto optical disc contained within a disc cartridge.
Figure 2:
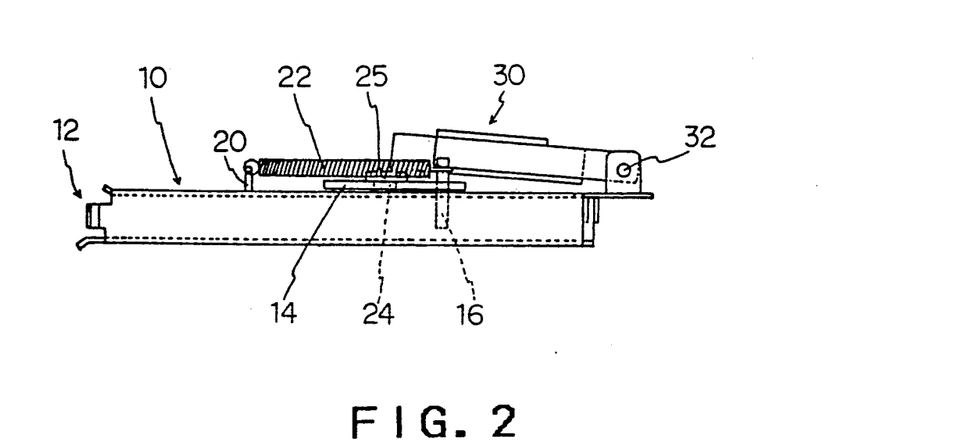
FIG. 2 is a side view of the shutter actuating device.

FIG. 1 and FIG. 2 illustrate a cartridge shutter actuating device embodying the invention when a magneto optical disc cartridge is not contained therein. A substantially box-shaped cartridge holder 10 is provided at one end with a cartridge insertion/discharge port 12 so that the magneto optical disc cartridge may be inserted into the holder 10 and discharged out of the holder through the port 12. An operating lever 14 mounted on the holder 10 is provided at one end with a vertically extending engaging pin 16. The lower portion of the engaging pin 16 is engaged into a guide groove 18 formed on the holder 10 and extending at about 45° with respect to the cartridge inserting direction. The lower portion of the engaging pin 16 is thus protruded into the cartridge accommodating space defined by the holder 10. Between the upper portion of the engaging pin 16 and a projection 20 on the holder 10 is connected a spring 22 so that the engaging pin 16 will normally be positioned in one end 18 of the guide groove 18. The opposite end of the lever 14 includes a slot 26 adapted to receive a guide pin 24 attached to the holder 10. The top of the guide pin 24 is covered by a cap 25 having a larger diameter for preventing removal of the guide pin 24 from the slot 26. Thus, the lever 14 is not only rotatable about the guide pin 24 but also displaceable in the lengthwise direction of the slot 26.

A bias magnet 30 comprising a E-shaped core 34 and a winding coil 36 is disposed substantially above a recessed portion 11 of the holder 10. The bias magnet 30 is rotatable about a horizontally extending shaft 32 so that it is retracted away from the holder 10 for ensuring smooth entry of the disc cartridge, as shown in FIG. 2. In the full-loaded position of the disc cartridge, the bias magnet 30 will be shifted to its operative position wherein it provides a magnetic field to the recording area of a magneto optical disc in the full-loaded cartridge. A mechanism for rotating the bias magnet 30 along with insertion/discharge of the disc cartridge has no concern with the subject matter of this invention and therefore is not shown in the drawing. Shown by phantom lines in FIG. 1 is an outer dimension of the magneto optical recording and/or reproducing apparatus determined by form factors of industrial standards.

Figure 4:
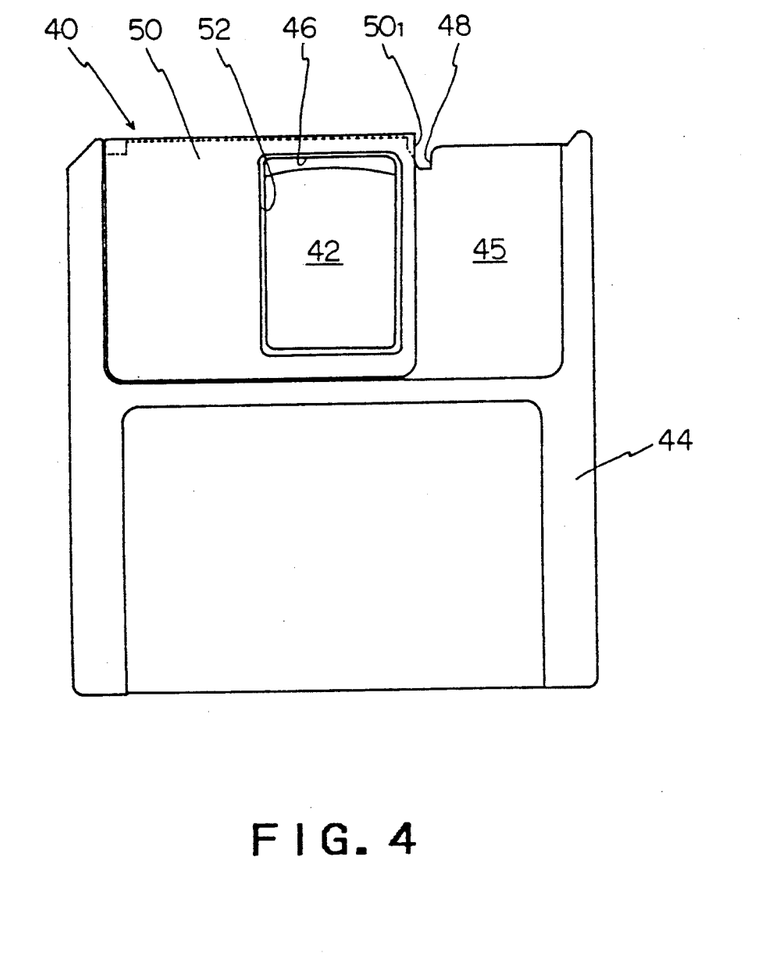
FIG. 4 is a plan view of the magneto optical disc cartridge with its shutter being in an opened position.

The magneto optical disc cartridge 40 to be used in combination with the embodiment comprises, as shown in FIGS. 3 and 4, a magneto optical disc 42 contained in a substantially flat, box-shaped jacket 44 made of hard material such as hard plastic. A shutter 50 having a substantially U-shaped configuration is attached to the hard jacket 44 within a large recess 45 including a central aperture 46. The shutter 50 is normally biased by shutter returning spring means (not shown) to be in the closed position as shown in FIG. 3, but may be laterally slidable toward the opened position shown in FIG. 4 in which a shutter window 52 lies just above the aperture 46 to expose the recording area of the disc 42. A notch 48 is formed on the front edge of the hard jacket 44 for retaining the shutter 50 in the opened position in FIG. 4.

It is noted that the hard jacket 44 is symmetric in construction between the upper and lower surfaces.

Figure 5:
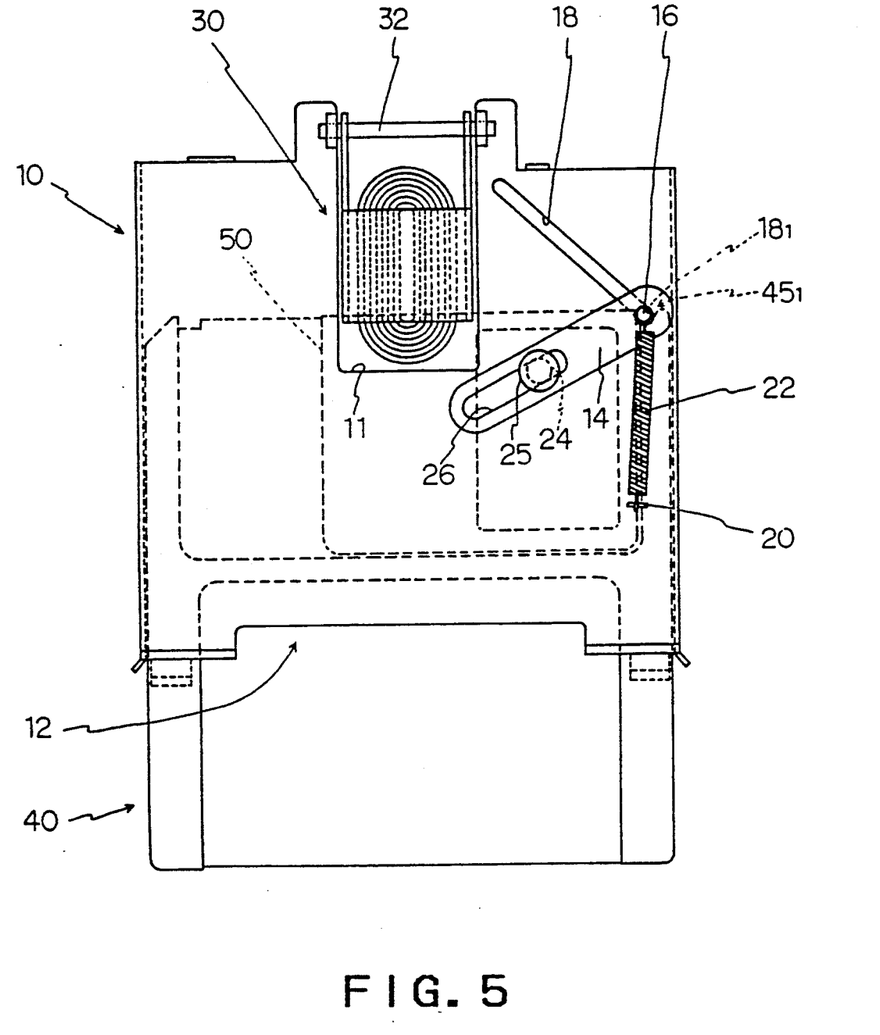
FIG. 5 is a plan view showing the half-loaded position of the disc cartridge, in which the shutter still remains in the closed position, and the shutter actuating device is about to operate.
Figure 6:
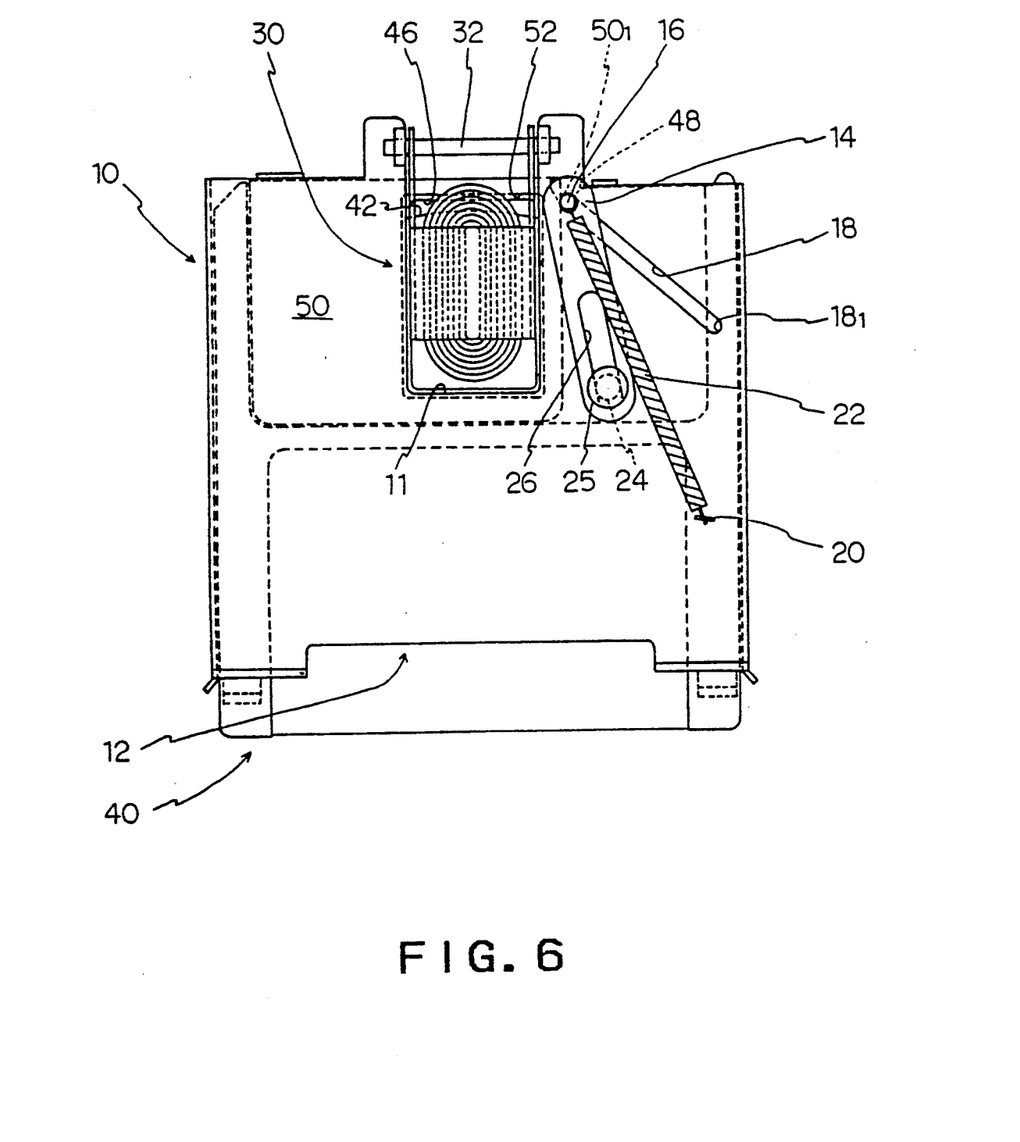
FIG. 6 is a plan view showing a full-loaded position of the disc cartridge in which the shutter is shifted to the completely opened position.

Operation of the shutter actuating device, along with insertion of the disc cartridge 40, will now be described in reference to FIGS. 5 and 6. When the disc cartridge 40 is inserted into the holder 10 through the port 12 up to the half-loaded position shown in FIG. 5, the lower portion of the engaging pin 16 is engaged within a gap 451 (FIG. 3) formed between the engaging edge 50 of the shutter 50 and a projected right-hand end of the hard jacket 44.

As the disc cartridge is further advanced from the half-loaded position, the engaging pin 16 is shifted inwardly with guidance of the oblique guide groove 18, against the biasing force of the spring 22. Thus, through engagement between the lower portion of the engaging pin 16 and the engaging edge 50 of the shutter 50, the shutter 50 is shifted to the left against the biasing force of the shutter return spring. When the disc cartridge 40 has reached the full-loaded position shown in FIG. 6, the engaging pin 16 comes into engagement with the notch 48 so that the shutter 50 is retained in the opened position shown in FIG. 4. In the cartridge full-loaded position, a magnetic field created by the bias magnet 30 in the operative position is given to the recording area of the disc 42 which is at this time exposed through the central aperture 46 and the shutter window 52.

In order to return the cartridge from the full-loaded position to the half-loaded position, it is enough to release engagement between the engaging pin 16 and the notch 48. This release action can be realized by, for example, providing such an ejecting lever (not shown) having operating part extending toward the operator's side, as pushing the front edge of the cartridge 40 in the direction of the port 12, so as that the operator could operate it. Once the engaging pin 16 is released from engagement with the notch 48, it will soon be returned to the original position 18 by means of the spring 22 and the shutter returning spring.

Figure 7:
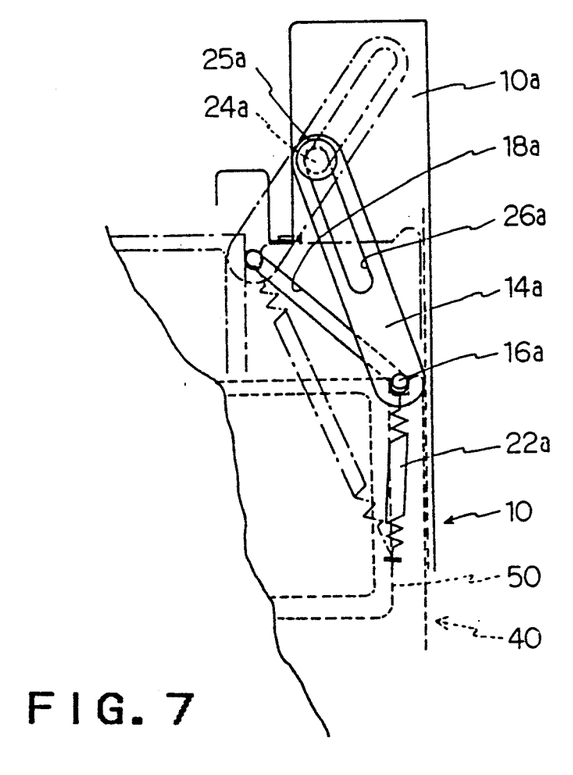
FIG. 7 is a partial plan view showing a modified arrangement of the shutter actuating device.

The lever 14 may be arranged in a different manner as shown in FIG. 7. More particularly, one side of the holder 10 is extended forward in the cartridge inserting direction to form an extension 10a on which a guide pin 24a is secured. A lever 14a is provided at its rear end (when viewed in the cartridge inserting direction) with an engaging pin 16a, and at the opposite, forward, end a slot 26a for accommodating the guide pin 24a. With such modified arrangement, the shutter 50 can be shifted in the like manner as in the aforementioned embodiment. The engaging pin 16a is brought into engagement with the engaging edge 50 of the shutter 50 when the cartridge 40 has been inserted up to the half-loaded position. With such engagement being retained, the shutter 50 may be opened along with further insertion of the cartridge 40. The lever 14a takes a position shown by phantom lines in the cartridge full-loaded position.

Figure 8:
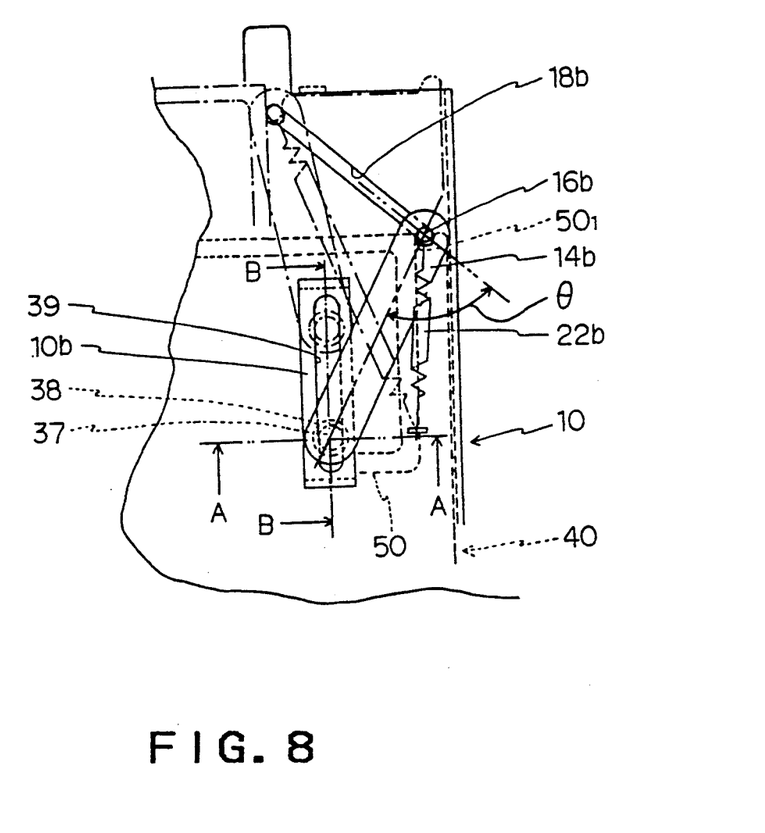
FIG. 8 is a partial plan view showing another embodiment of the shutter actuating device.
Figure 9:
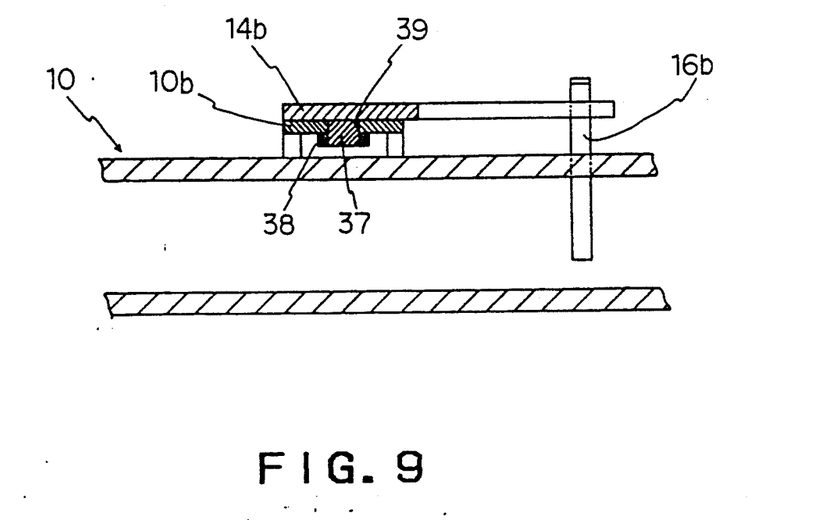
FIG. 9 is a cross-section taken along the line A—A in FIG. 8.
Figure 10:
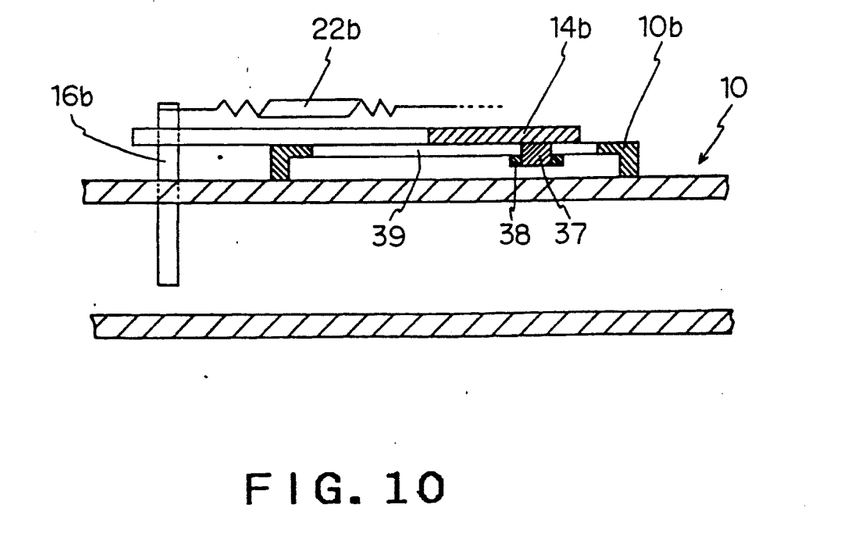
FIG. 10 is a cross-section taken along the line B—B in FIG. 8.

Another embodiment of the shutter actuating device is shown in FIG. 8 through FIG. 10. To a forward end of a lever 14b is secured a vertically extending pin 16b, and a downward guide pin 37 with a cap 38 is secured to the rear end. A platform 10b mounted above the holder 10 is provided with a slot 39 extending straight in the cartridge inserting direction. The guide pin 37 is received within the slot 39 and guided therealong. With such arrangement, engagement between the engaging pin 16b and the engaging edge 50 of the shutter 50 is established in the cartridge half-loaded position. Along with further advancement of the cartridge, the engaging pin 16b is shifted inwardly along the guide groove 18b to open the shutter 50. In this embodiment, the length of the lever 14b and position of the slot 39 are relatively determined such that an angle r between the lever 14b and the guide groove 18b be always smaller than 90° during movement of the engaging pin 16b. Thus, as the engaging pin 16b moves along the guide groove 18b, the guide pin 37 will be shifted in the cartridge inserting direction along the slot 39, whereas the lever 14b will be rotated about the guide pin 37 in the counter clockwise direction.

The cartridge 40 is returned from the full-loaded position to the half-loaded position by means of the spring 22b which causes the engaging pin 10b to move back to the outermost end of the guide groove 18b, during which the guide pin 37 is shifting along the slot 39 in the cartridge ejecting direction, and the lever 14b is rotating about the guide pin 37 in the clockwise direction. It will be understood that in this embodiment the guide pin 37 is designed to only move back and forth within the straight extending slot 39 in the cartridge inserting/ejecting directions, assuring smooth operation of the shutter.

In FIG. 8, parts and elements associated with the holder 10 are shown by solid lines as they are in the cartridge half-loaded position and by dot-dash lines in the cartridge full-loaded position, whereas parts and elements associated with the cartridge 40 are shown by dotted lines as they are in the cartridge half-loaded position and by phantom lines in the cartridge full-loaded position.

Figure 11:
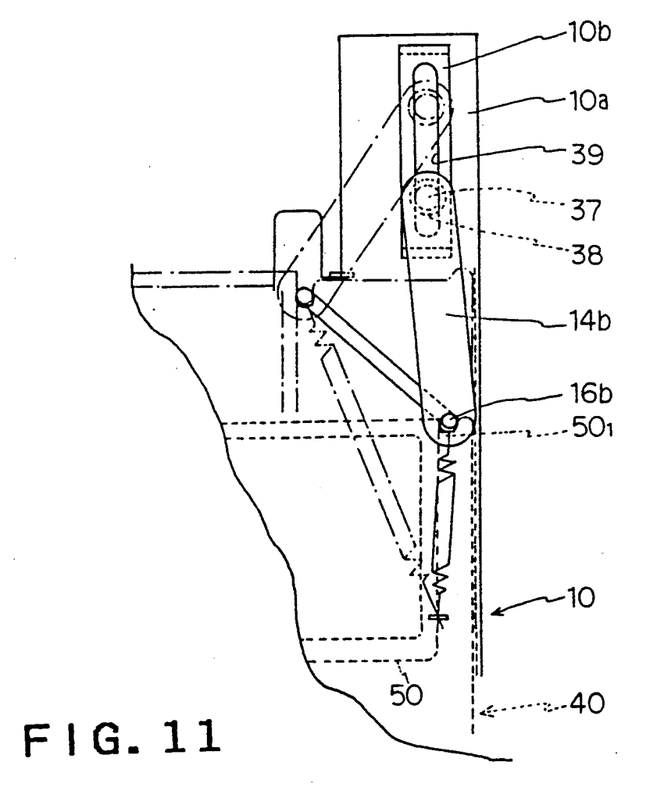
FIG. 11 is a partial plan view showing a modified arrangement of the shutter actuating device shown in FIGS. 8 through 10.

The arrangement shown in FIGS. 8 to 10 may further be modified as shown in FIG. 11 in which the slot 39 for guiding the guide pin 37 of the lever 14b is formed in a platform 10b bridged above a forward extension part 10a of the holder 10, and the engaging pin 16b is secured to the rear end of the lever 14b. In this modification, the slot 39 may be formed directly in the forward extension part 10a.

Although the invention has been described in conjunction with specific embodiment thereof, it is to be understood that many variations and modifications may be made without departing from the scope and spirits of the invention as defined in the appended claims.

What is claimed is:

1. A device which opens a laterally slidable shutter of a disk cartridge along with insertion of the disk cartridge into a holder of a recording and/or reproducing apparatus which performs a recording and/or reproducing operation on a disk shaped recording medium contained in the disk cartridge, which comprises:

engaging means comprising an engaging pin extending through an oblique-inwardly extending groove provided on said holder and protruding into a cartridge accommodating space defined by the holder, said engaging pin being secured to one end of a lever member displaceably arranged on the holder, all adapted to come into engagement with a specific portion of the shutter when the disk cartridge is half loaded into the holder; said engagement between said engaging means and said specific shutter portion being retained during further advancement of the disk cartridge into the holder;

guide means comprising said oblique-inwardly extending groove formed on said holder for guiding said engaging means in substantially an oblique direction between a cartridge inserting direction and a shutter sliding direction;

spring means for biasing said engaging means toward a direction opposite to the cartridge inserting direction; and slot means extending in a lengthwise direction formed at the other end of said lever member for displaceably supporting a first guide pin mounted on the holder, said first guide pin being linearly and rotatably displaceable relative to said slot means and acting as a center of rotation of said lever member as said engaging means is moved in the shutter sliding direction.

2. A device which opens a laterally slidable shutter of a disk cartridge along with insertion of the disk cartridge into a holder of a recording and/or reproducing apparatus which performs a recording and/or reproducing operation on a disk shaped recording medium contained in the disk cartridge, which comprises:

engaging means comprising an engaging pin extending through an oblique-inwardly extending groove provided on said holder and protruding into a cartridge accommodating space defined by the holder, said engaging pin being secured to one end of a lever member displaceably arranged on the holder, all adapted to come into engagement with a specific portion of the shutter when the disk cartridge is half loaded into the holder, said engagement between said engaging means and said specific shutter portion being retained during further advancement of the disk cartridge into the holder;

guide means comprising said oblique-inwardly extending groove formed on said holder for guiding said engaging means in substantially an oblique direction between a cartridge inserting direction and a shutter sliding direction;

spring means for biasing said engaging means towards a direction opposite to the cartridge inserting direction; and a platform means having a slot extending in a lengthwise direction mounted above said holder for displaceably supporting a downwardly extending guide pin mounted to the other end of said lever member, said downwardly extending guide pin mounted to the other end of said lever member, said downwardly extending guide pin being displaceable relative to said slot as said engaging means is moved in the shutter sliding direction.

3. A device which opens a laterally slidable shutter of a disk cartridge along with insertion of the disk cartridge into a holder of a recording and/or reproducing apparatus which performs a recording and/or reproducing operation on a disk-shaped recording medium contained in the disk cartridge, which comprises:

an elongated lever member including an engaging pin provided at one end thereof and engageable with a specific portion of said shutter, and a lengthwise extending slot formed near the other end thereof;

a guide pin mounted on said holder and received in said slot for acting as a center of rotation of said lever member and displaceably supporting said lever member linearly and rotatably on said holder;

a guide groove formed in said holder for guiding said engaging pin in substantially an oblique direction between a cartridge inserting direction and a shutter sliding direction, and;

a spring means for biasing said engaging pin toward a direction opposite to the cartridge inserting direction.

4. A device which opens a laterally slidable shutter of a disk cartridge along with insertion of the disk cartridge into a holder of a recording and/or reproducing apparatus which performs a recording and/or reproducing operation on a disk-shaped recording medium contained in the disk cartridge, which comprises:

an elongated lever member including an engaging pin provided at one end thereof and engageable with a specific portion of said shutter, and a guide pin secured at the other end thereof said guide pin serving as a center of rotation for said elongated lever member, with respect to a first guide groove;

said first guide groove mounted on said holder for guiding said guide pin substantially in a cartridge inserting direction;

a second guide groove formed in said holder for guiding said engaging pin in substantially an oblique direction between the cartridge inserting direction and a shutter sliding direction, and;

spring means for biasing said engaging pin toward a direction opposite to the cartridge inserting direction.

* * * * *